US010082891B2

(12) United States Patent
Feng et al.

(10) Patent No.: US 10,082,891 B2
(45) Date of Patent: *Sep. 25, 2018

(54) TOUCHPAD OPERATIONAL MODE

(71) Applicant: Lenovo (Singapore) Pte. Ltd., Singapore (SG)

(72) Inventors: Xin Feng, Arcadia, CA (US); Aaron Michael Stewart, Raleigh, NC (US); Mei-Wen Sun, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 34 days.

This patent is subject to a terminal disclaimer.

(21) Appl. No.: 14/860,574

(22) Filed: Sep. 21, 2015

(65) Prior Publication Data

US 2016/0011682 A1  Jan. 14, 2016

Related U.S. Application Data

(63) Continuation of application No. 13/737,691, filed on Jan. 9, 2013, now Pat. No. 9,141,211.

(51) Int. Cl.
*G06F 3/041* (2006.01)
*G06F 3/0354* (2013.01)
*G06F 3/01* (2006.01)
*G06F 3/0488* (2013.01)
(Continued)

(52) U.S. Cl.
CPC ........ *G06F 3/03547* (2013.01); *G06F 1/1616* (2013.01); *G06F 1/1643* (2013.01); *G06F 3/017* (2013.01); *G06F 3/018* (2013.01); *G06F 3/041* (2013.01); *G06F 3/0412* (2013.01); *G06F 3/0416* (2013.01); *G06F 3/04817* (2013.01); *G06F 3/04883* (2013.01);
(Continued)

(58) Field of Classification Search
CPC ............ G06F 3/03547; G06F 3/04817; G06F 1/1616; G06F 1/1643; G06F 3/0416; G06F 3/0412; G06F 3/017; G06F 3/04886; G06F 3/018; G06F 3/04883; G06F 3/041; G06F 2203/04103; G06F 2203/04104

See application file for complete search history.

(56) References Cited

U.S. PATENT DOCUMENTS

2009/0295737 A1* 12/2009 Goldsmith ............. G06F 3/018
345/169
2010/0245260 A1* 9/2010 Louch .................... G06F 3/038
345/173

(Continued)

*Primary Examiner* — Premal R Patel
(74) *Attorney, Agent, or Firm* — Brian J. Pangrle

(57) ABSTRACT

A system can include a processor; a memory device having memory accessible by the processor; a touchpad operatively coupled to the processor; a display nonoverlapping the touchpad and operatively coupled to the processor; and instructions stored in the memory and executable by the processor where the instructions include instructions to instruct the system to: associate different individual gestures with different individual touchpad operational modes, select one of the touchpad operational modes responsive to receipt via the touchpad of an associated one of the gestures, and control rendering of a graphic to the display wherein the graphic includes a touchpad field and a control field associated with the selected one of the touchpad operational modes.

19 Claims, 12 Drawing Sheets

(51) Int. Cl.
*G06F 1/16* (2006.01)
*G06F 3/0481* (2013.01)

(52) U.S. Cl.
CPC ............ *G06F 3/04886* (2013.01); *G06F 2203/04103* (2013.01); *G06F 2203/04104* (2013.01)

(56) References Cited

U.S. PATENT DOCUMENTS

| | | | |
|---|---|---|---|
| 2010/0328236 A1* | 12/2010 | Ma | G06F 3/038 345/173 |
| 2010/0328250 A1* | 12/2010 | Gorsica | G06F 1/1616 345/174 |
| 2011/0041102 A1* | 2/2011 | Kim | G06F 3/04883 715/863 |
| 2013/0162539 A1* | 6/2013 | Wang | G06F 3/041 345/168 |

* cited by examiner

TOUCHPAD OPERATIONAL MODE

RELATED APPLICATION

This application is a continuation of a U.S. patent application having Ser. No. 13/737,691, filed 9 Jan. 2013 (U.S. Pat. No. 9,141,211, issued 22 Sep. 2015), which is incorporated by reference herein.

TECHNICAL FIELD

Subject matter disclosed herein generally relates to technologies and techniques for touchpads.

BACKGROUND

Touchpads find use with a variety of systems such as notebook (or laptop) computers, netbooks, etc. As an example, consider a notebook computer that includes a display mounted in one portion and a keyboard and a touchpad mounted in another portion where the two portions are connected, for example, via a hinge. While such a system may include a separate mouse as a pointing device, inclusion of a touchpad provides for more compactness and portability of the notebook computer. As described herein, various technologies, techniques, etc. provide one or more touchpad operational modes.

SUMMARY

A method can include receiving an initiation command to initiate an operational mode of a touchpad; responsive to the initiation command, initiating the operational mode and rendering a graphic to a display (e.g., where the graphic includes a touchpad field and a control field); receiving input via the touchpad and mapping the input to the graphic; receiving additional input and associating the additional input with a control of the graphic; and executing the control of the control field of the graphic (e.g., to perform an action that acts upon the input mapped to the graphic). Various other devices, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
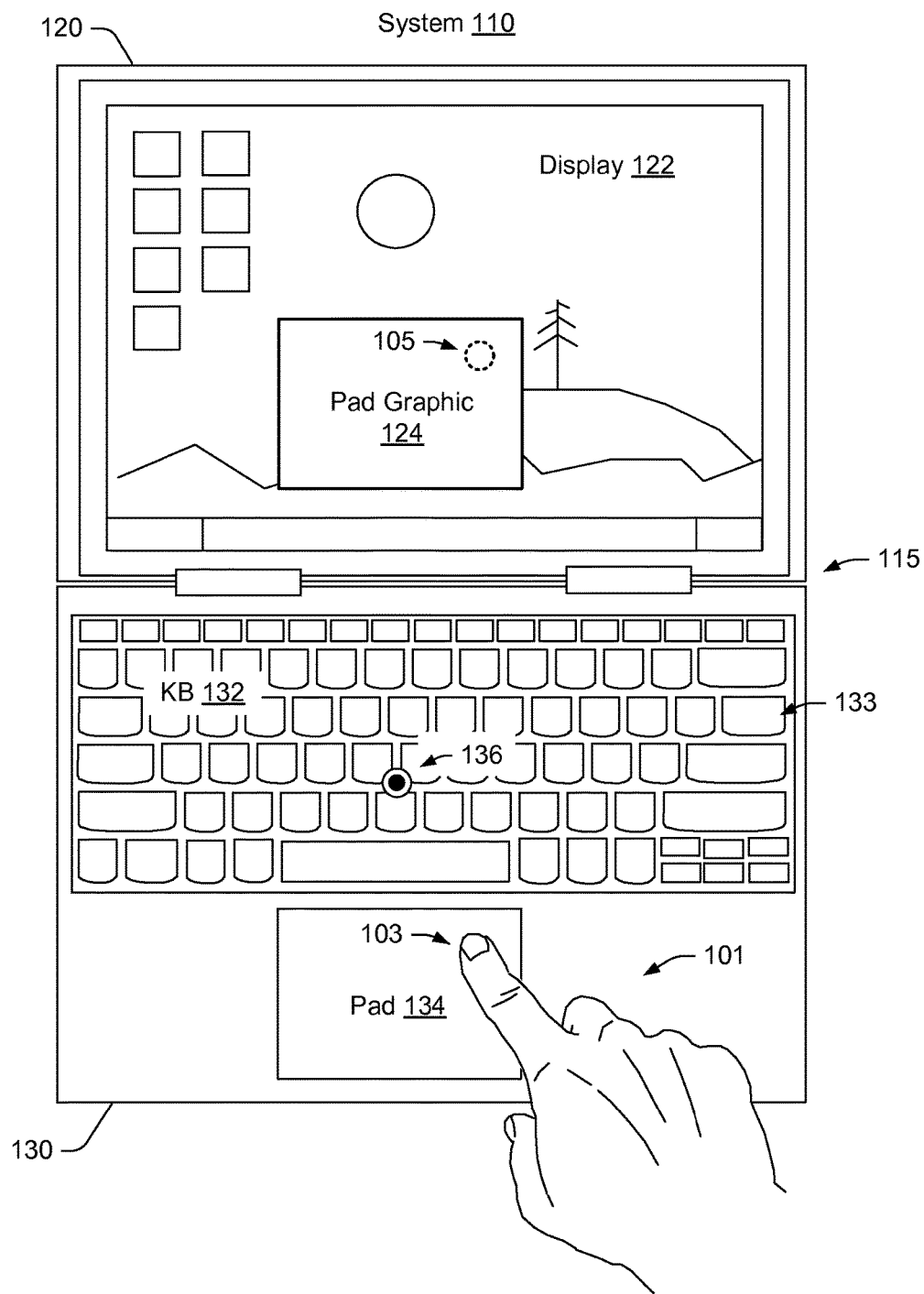
FIG. 1 is a diagram of an example of a system that includes a touchpad operating in an example of an operational mode.

FIG. 1 shows an example of a system 110 that includes a display portion 120 with a display 122 and a keyboard portion 130 with a keyboard 132 where the two portions 120 and 130 are operably connected via a mechanism 115, which may be a hinge mechanism that pivotably connects the display portion 120 and the keyboard portion 130 (e.g., in a clamshell or other arrangement). As an example, wires may be provided that interconnect the display portion 120 and the keyboard portion 130 (e.g., for power, communication of data, communication of instructions, etc.). As an example, circuitry may be included for wireless communication between the display portion 120 and the keyboard portion 130 of the system 110 (e.g., wireless display, etc.).

In the example of FIG. 1, the keyboard portion 130 includes a touchpad 134 and optionally a pointing stick device 136 (e.g., positioned within the boundaries of the keys 133 of the keyboard 132. As to the optional pointing stick device 136, as an example, it may operate by sensing applied force (e.g., via circuitry that includes one or more resistive strain gauges).

As to the touchpad 134, as an example, it may include various features of a touchpad such as the Synaptics TouchPad (Synaptics Inc., Santa Clara, Calif.). As an example, a touchpad may be a touch-sensitive interface that senses the position of a user's finger (or fingers) on its surface. As an example, a touchpad may include circuitry for one or more of capacitive sensing, conductance sensing or other sensing.

While a touchpad may be overlain or otherwise sandwiched with a display (e.g., LCD, LED, etc.) to form a touchscreen that can sense absolute position, resolution may be limited by size. As an example, for a touchpad that does not overlap a display (e.g., a touchpad on a keyboard portion of a notebook computer, etc.), dragging motion of a finger may be translated by circuitry into a finer, relative motion of a cursor graphic rendered to the display (e.g., analogous to the handling of a mouse that is lifted and put back on a surface). As an example, a touchpad may include "hardware" buttons akin to those of a mouse left button and right button (e.g., positioned below, above, or beside a portion of a touchpad configured for input such as freeform input).

As an example, a touchpad and associated device driver may interpret tapping on a touchpad as a click and, for example, a tap followed by a continuous pointing motion (a "click-and-a-half") as dragging. Tactile touchpads may allow for clicking and dragging by incorporating button functionality into the surface of the touchpad itself. For example, to make a selection, a user may press down on the touchpad instead of a physical button; where, to drag, instead performing a "click-and-a-half" technique, the user may press down while "on" an selected object and drag without releasing pressure. As an example, a touchpad and associated driver may also allow for use of multiple fingers (e.g., for gestures, etc.)

As an example, a touchpad may include a "hotspot" as a dedicated or programmable spot (or region) located on the touchpad. For example, a hotspot edge region may allow for moving a finger along the edge region to issue an instruction that acts as an instruction of a scroll wheel (e.g., controlling a scrollbar).

As an example, a touchpad may include one or more backlights (e.g., LEDs, optical fiber lights, etc.), which may help to guide a user as to regions (e.g., portions) of the touchpad, feedback, etc. For example, a touchpad may include a color changing LED to indicate operational mode of the touchpad.

As an example, a system can include circuitry for both direct touch (e.g. via touchscreen) and indirect touch (e.g. via a touchpad). As an example, a system cam include circuitry to provide for one or more of: (a) character-based input, which may be coupled with hand-writing recognition; (b) free-form input (e.g. symbol, drawing, signature, etc.), which may optionally be coupled with recognition (e.g., character recognition as to symbols, glyphs, etc., primitive recognition as to primitive shapes, etc.); and (c) pre-defined macro execution based on input (e.g. audio, image, video, long text, etc.).

As an example, a system can include both on-screen UI and interaction, by which an in-direct touch device can emulate a touch device (e.g., a touchpad emulating a direct touch device such as a touchscreen).

As an example, a system may include circuitry for input of context-based touch gestures. As to some examples of gestures and actions, a "tap and hold" (e.g., a hover gesture) may be associated with one or more instructions to provide preview content and/or metadata information on one or more predictive selections (e.g., characters, etc.), a swipe may act to navigate a predictive character list, content list (e.g., of content file icons), etc.; a press and hold may act to display a more complete list of predicated characters, etc.; a gesture or gestures such as a five finger spreading and/or closing, five finger double tapping, five finger extension, etc. may initiate and/or switch an operational mode (e.g. character input mode, free drawing mode, pre-defined macro mode, normal input mode, etc.); a click may optionally be used as a cue to end one character input; a device may include a proximity sensor where sensed information (e.g., a gesture movement proximate to the sensor) can input an instruction; etc.

As an example, where a touchpad may take user input information via force or touch area, such information may optionally be used: (a) to provide stroke width variation; and (b) the level of force or touch area may be used to trigger an action (e.g. end of character input).

As an example, if a touchpad surface has capacitive sensing capability that can differentiate an artifact (e.g., a pen) and human finger, a system may support using that information to provide a different mode: as an example, a pen touch can bring up a character input mode while a finger touch can return back to a normal touchpad mode.

As an example, a system may include one or more physical and/or backlight cues (e.g., via an indirect touch input device) that can aid a user in locating an input and mapping it to an on-screen UI (e.g., graphical user interface or GUI). As an example, a LED may be positioned to illuminate a portion of a touchpad (e.g., a line, a border, etc.) to help guide a user when using the touchpad for input.

As an example, a system may include circuitry for multi-modal interaction. As an example, if voice recognition is supported, "hand writing" may initiate a character input mode of a touchpad (e.g., which may assist in correcting, supplementing, etc., voice recognition as in a voice to text process).

As an example, a system may include circuitry that can use a palm check algorithm to mitigate accidental input; and/or use a middle button zone on a touchpad to switch a mode, to render a list of possible modes, to initiate a mode, etc.

Referring again to the example of FIG. 1, a touchpad graphic 124 is illustrated as being rendered to the display 122 where a user's hand 101 has an extended finger that touches the touchpad 134 (e.g., via a fingertip of the finger) to register a touch 103 where the touch 103 is mapped to the touchpad graphic 124 as indicated by a dotted circle 105.

In the example of FIG. 1, the system 110 is in a touchpad operational mode. As shown in the example of FIG. 1, the touchpad operational mode involves rendering the touchpad graphic 124 to the display 122 such that input received via the touchpad 134 may be mapped to, guided by, etc., information displayed in the touchpad graphic 124 (e.g., rendered to the display 122).

A system such as the system 110 of FIG. 1 may provide for input of foreign language characters (e.g., as used in East Asian countries, Arabic countries, etc.); provide for input of symbols or letters with accents (e.g., glyphs, etc.); provide for input of multimedia objects (e.g., such as video, image, music files, etc.); provide for input to execute macros or templates (e.g., such as a long text for disclaimer, email signature, hospital admission text, standardized commands, phrases, etc.).

Figure 2:
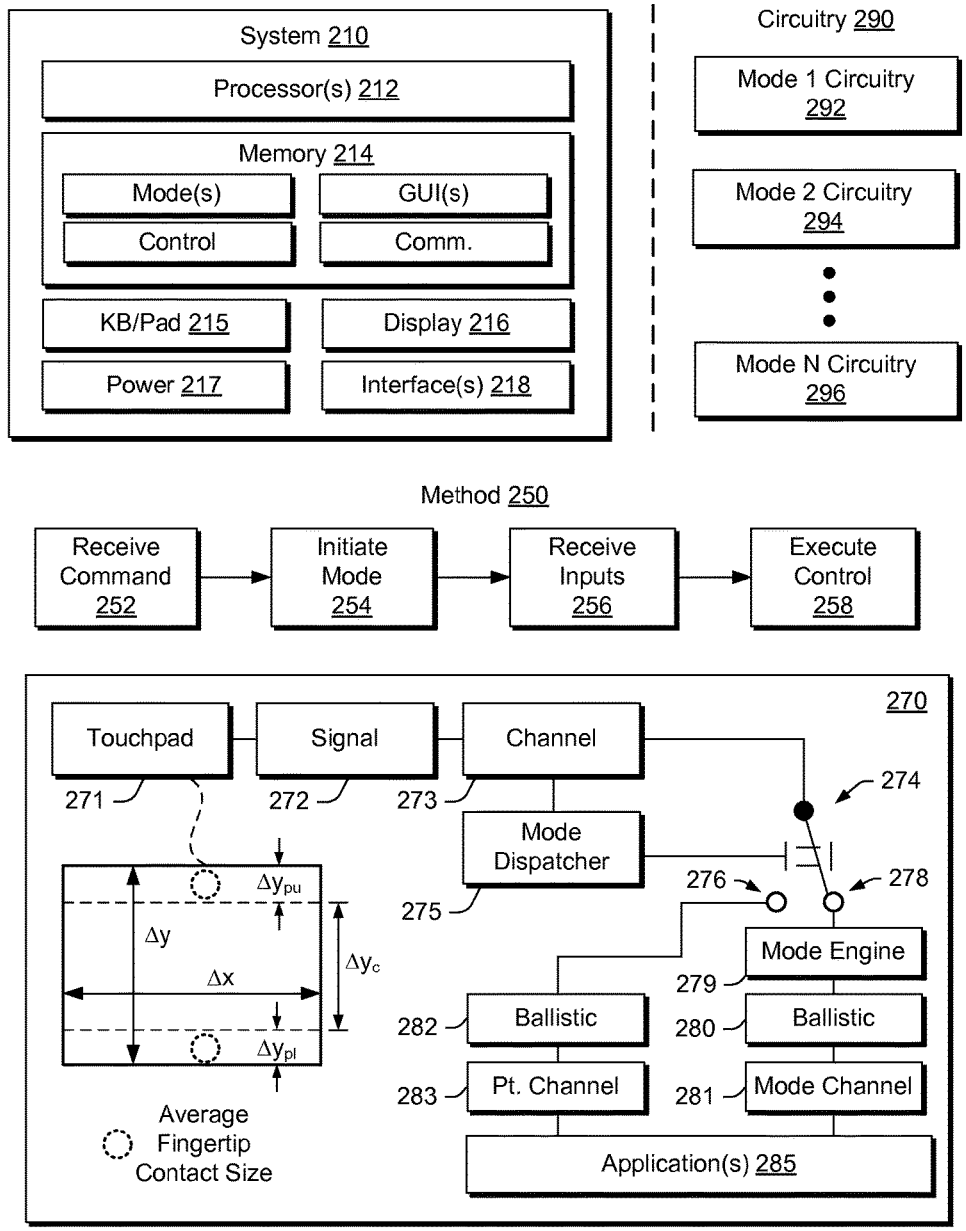
FIG. 2 is a series of diagrams of examples of a system, circuitry, a method and circuitry for touchpad operational mode selection.

FIG. 2 shows an example of a system 210, an example of a method 250, an example of a sub-system 270 and examples of circuitry 290. As to the system 210, it includes one or more processors 212 (e.g., cores), memory 214 (e.g., one or more memory devices that include memory), a keyboard (KB) with an associated touchpad 215, a display 216, a power supply 217 and one or more communication interfaces 218. As an example, a communication interface may be a wired or a wireless interface. In the example of FIG. 2, the memory 214 can include one or more modules such as, for example, a mode module, a control module, a GUI module and a communication module. Such modules may be provided in the form of instructions, for example, directly or indirectly executable by at least one of the one or more processors 212.

In the example of FIG. 2, the method 250 includes a reception block 252 for receiving a command, an initiation block 254 for initiating a touchpad operational mode responsive to the command, a reception block 256 for receiving one or more inputs and an execution block 258 for executing one or more actions based at least in part on at least one of the one or more received inputs, for example, where the one or more actions comport with specifications of the touchpad operational mode.

As to the sub-system 270 of FIG. 2, it includes a touchpad 271 for output of a signal 272 via a channel 273. As shown in the example of FIG. 2, the channel 273 outputs a signal to a switch 274 and also to a mode dispatcher 275. Depending on the type of signal, as interpreted by the mode dispatcher 275, the switch switches operational mode of the touchpad. For example, to the left is a "normal" state 276 while to the right is a "mode" state 278 for a particular mode. As an example, where the mode dispatcher 275 causes the switch 274 to select the mode state 278, a mode engine 279 receives the signal via the channel and processes it via appropriate ballistics 280 and an associated mode channel 281 (or mode channels), for example, to provide for interaction with one or more applications 285 (e.g., code executing at least in part on a system). As indicated in the example of FIG. 2, where the switch 274 is to the left, in the normal state 276, the signal via the channel is processed using appropriate ballistics 282 and an associated pointing channel 283, for example, to provide for interaction with one or more applications 285 (e.g., code executing at least in part on a system such as to associate the signal with a cursor graphic rendered by a system to a display).

As to a particular type of touchpad device, circuitry for a circular touch gesture for scrolling that includes a modal selection mechanism is described in an article by Arthur et al., "Evaluating Touch Gestures for Scrolling on Notebook Computers", CHI 2008, Apr. 5-10, 2008, Florence, Italy, which is incorporated by reference herein. As to a particular type of touchpad device, a communication specification entitled "MEP Over I²C: Synaptics I²C Physical Layer Specification" (PN: 511-000039-01 Rev. B, 2007), which is incorporated by reference herein, describes communication technologies and techniques.

FIG. 2 also shows an example of a touchpad (e.g., touch input surface) with dimensions in an x, y coordinate system. As indicated, a touchpad may include one or more peripheral regions (e.g., or portions) where each of the peripheral regions may be dimensioned to allow for touch input using an average fingertip. As an example, one or more dimensions may be based in part on an average dimension or dimensions of an index finger. For example, a touchpad may be configured to account for an average fingertip touch area width (e.g., about 1.6 cm to about 2 cm for most adults) and an average fingertip touch area height (e.g., about 0.5 cm to about 1 cm for most adults). As an example, a peripheral region may include a dimension of at least about a few millimeters in height (e.g., along the y-axis in the example of FIG. 2); noting that circuitry may provide for distinguishing overlap between a peripheral region and a central region and, for example, different features in a peripheral region (e.g., by calculating a center point for a touch). While the example of FIG. 2 illustrates peripheral regions along upper and lower border (e.g., $\Delta y_{pu}$ and $\Delta y_{pl}$), a peripheral region may be additionally or alternatively along a left border or a right border (e.g., $\Delta x_{pl}$ and $\Delta x_{pr}$). In the example of FIG. 2, a substantially central region includes a dimension along the y-axis (e.g., $\Delta y_c$); noting that it may extend to a border or borders (e.g., depending on configuration of a peripheral region or regions). While FIG. 2 shows a rectangular example, a circular, oval or other shape may be used (e.g., with a dimension or dimensions suitably adapted for shape).

As to the circuitry 290, in the example of FIG. 2, circuitry components 292, 294 and 296 are shown as being associated with modes 1, 2 and N. As an example, the circuitry components 292, 294 and 296 may include instructions executable by a processor to instruction a system to perform one or more actions. For example, the circuitry components 292, 294 and 296 may be or may include instructions stored or storable in one or more computer-readable (e.g., processor-readable) storage media (e.g., one or more memory devices). As an example, the memory 214 of the system 210 may include such instructions for implementation of the mode 1 circuitry 292, the mode 2 circuitry 294 or the mode N circuitry 296. As indicated, circuitry for more than one mode may be provided.

As an example, the sub-system 270 may be operable according to one or more of the modes 1, 2 and N (e.g., where N is some arbitrary number associated with a total number of modes). As an example, mode 1 circuitry 292 may, at least in part, control operation of the mode dispatcher 275 and the mode engine 279 of the sub-system 270. As an example, where multiple modes are available in addition to a "normal" mode (e.g., "normal" state 276 of the switch of the sub-system 270), a mode dispatcher (e.g., such as the mode dispatcher 275) may be configured to associated signals with modes for purposes of selecting an appropriate mode engine (e.g., such as the mode engine 279). For example, the mode dispatcher 275 of the sub-system 270 may include an association table for gesture signals and each of the modes 1, 2 and N (e.g., as well as any intermediate mode between mode 2 and mode N). In such an example, a five-finger open gesture may cause the mode dispatcher 275 to switch to mode 1 while a three-finger clockwise swirl gesture may cause the mode dispatcher 275 to switch to mode 2. Further, in such an example, a five-finger close gesture may cause the mode dispatcher 275 to switch from mode 1 to the "normal" mode (e.g., the normal state 276) while a three-finger counter-clockwise swirl gesture may cause the mode dispatcher 275 to switch from mode 2 to the "normal" mode (e.g., the normal state 276).

While the sub-system 270 of FIG. 2 shows the mode dispatcher 275 as being dependent on the signal 272 from the touchpad 271, one or more other approaches may be implemented to select or switch a mode. For example, a voice command, a keyboard command, a touchscreen command, etc., may be used for selection of a mode, switching from one mode to another mode, etc.

Figure 3:
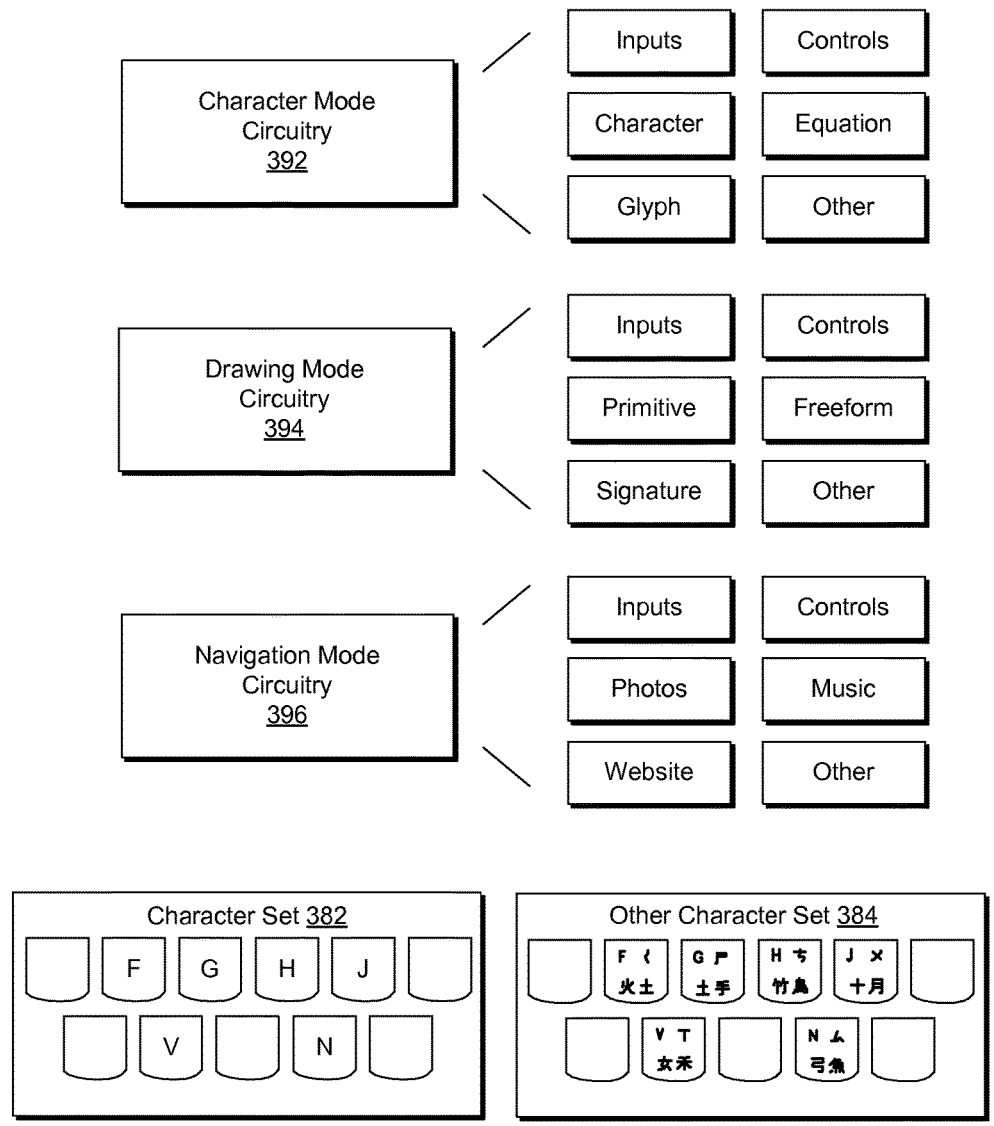
FIG. 3 is a diagram of examples of circuitry for various operational modes and some examples of character sets.

FIG. 3 shows examples of circuitry 392, 394 and 396 as well as some examples of character sets 382 and 384 (e.g., as associated with keys of a keyboard). As an example, the circuitry 392, 394 and/or 396 may be implemented in a system such as the system 110 of FIG. 1, the system 210 of FIG. 2, etc., optionally where such a system includes one or more features of the sub-system 270 of FIG. 2.

In the example of FIG. 3, the circuitry 392 is character mode circuitry, the circuitry 394 is drawing mode circuitry and the circuitry 396 is navigation mode circuitry. The character mode circuitry 392 can include modules for inputs, controls, characters, equations (e.g., mathematical symbols, logic symbols, etc.), glyphs, etc. As an example, a character may differ from a glyph yet include one or more glyphs or be composed of a collection of glyphs; also, a glyph may represent a character, for example, according to a stylized font, etc. (e.g., consider the character "a" in an italics, Arial, Times New Roman or other style as represented by a glyph).

As shown, the drawing mode circuitry 394 can include modules for inputs, controls, shape primitives, freeform, signatures, etc. A primitive module may be for basic shapes associated with a drawing program and a freeform module may be for a curve freeform, spray paint freeform, etc. As to signatures, a module may provide for input a user's signature, for example, for purposes of signing a document and optionally associating the signature with one or more certificates (e.g., for authentication).

As shown, the navigation mode circuitry 396 can include modules for inputs, controls, photos, music, websites, etc. For example, a photo module may provide for identifying one or more photo files and a control module may provide for associating a selected photo file with an email application, IM application, SKYPE® application (Microsoft Corp., Redmond, Wash.), etc., for transmission of the photo file.

In the example of FIG. 3, the character set 382 is a character set that may be associated with a keyboard where each letter key has a letter thereon. As to the character set 384, various characters are shown as being associated with each letter key. As an example, a keyboard that is configured for multiple character sets may include associated circuitry for one or more character modes. In such a manner, a keyboard and a touchpad may operate in a cooperatively where a user may input characters via keys of the keyboard and via strokes on the touchpad (e.g., where the touchpad operates in a particular character mode).

Figure 4:
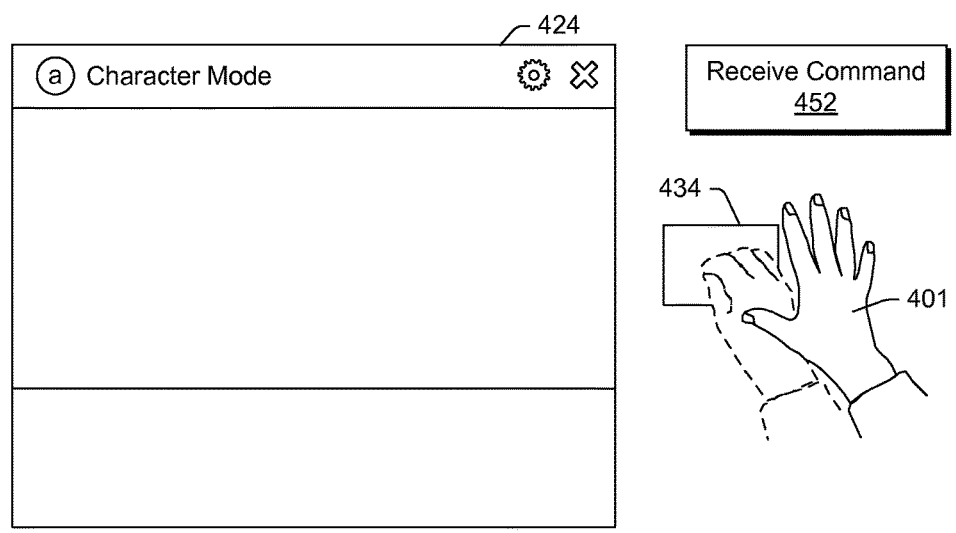
FIG. 4 is a series of diagrams of examples of a touchpad operational mode.
Figure 4:
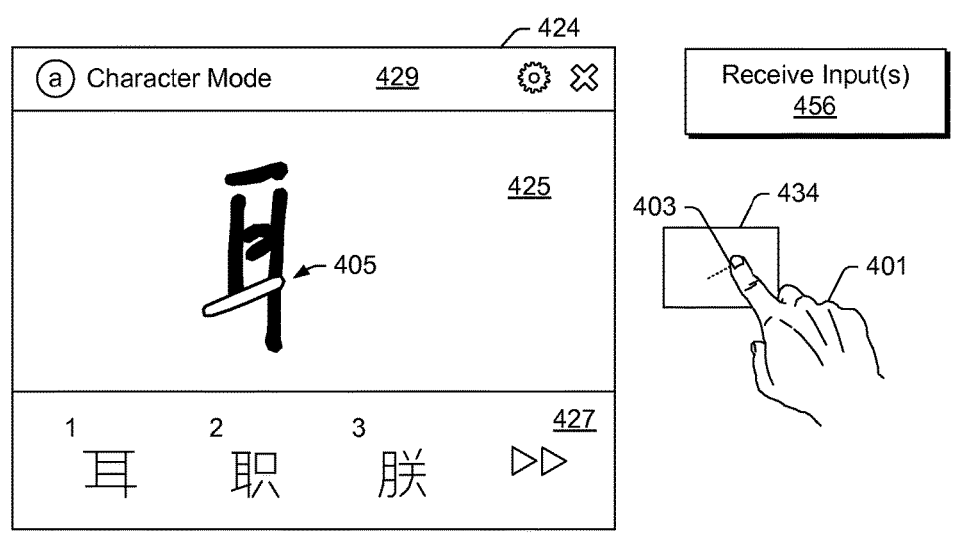

FIG. 4 shows an example of a graphic 424 as associated with a character operational mode of a touchpad 434. In the example of FIG. 4, a user's hand 401 inputs a gesture using the touchpad 434, for example, per a reception block 452 of a method. In response to receipt of the input, circuitry causes the graphic 424 to be rendered to a display. For example, a mode dispatcher may identify a signal(s) via a channel or channels of a touchpad and associate that signal(s) with a touchpad operational mode (e.g., using a table, etc.).

Once the touchpad graphic 424 is rendered to a display, a user's hand 401 may touch the touchpad 434 and drag a finger across the touchpad 434 to input a stroke 403. In turn, a reception block 456 of a method may cause such input to be rendered as a character stroke 405 to the graphic 424. Further, a character recognition algorithm may be implemented that acts to recognize a character based on one or more strokes received via the touchpad 434 and to present one or more candidate characters in a field of the graphic 424. As an example, character recognition may provide for recognition of glyphs, symbols, etc., which may be considered characters, parts of characters, etc.

In the example of FIG. 4, the graphic 424 may include a character field 425 for rendering character strokes and one or more control fields 427 and 429. As an example, a central portion of the touchpad 434 may receive strokes as input where such input is mapped to the character field 425 (e.g., a touchpad field) and a peripheral portion of the touchpad 434 may receive touch(es) as input where such input is mapped to one of the control fields 427 or 429 of the graphic 424. In such an example, an approximately one-to-one mapping may exist between regions of the touchpad 434 and regions (e.g., fields) of the graphic 424.

Figure 5:
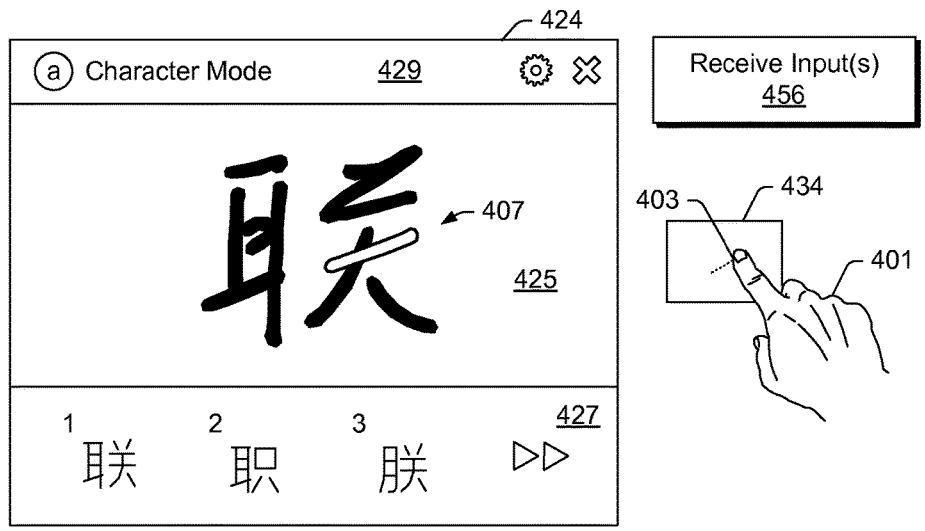
FIG. 5 is a series of diagrams of examples of a touchpad operational mode.
Figure 5:
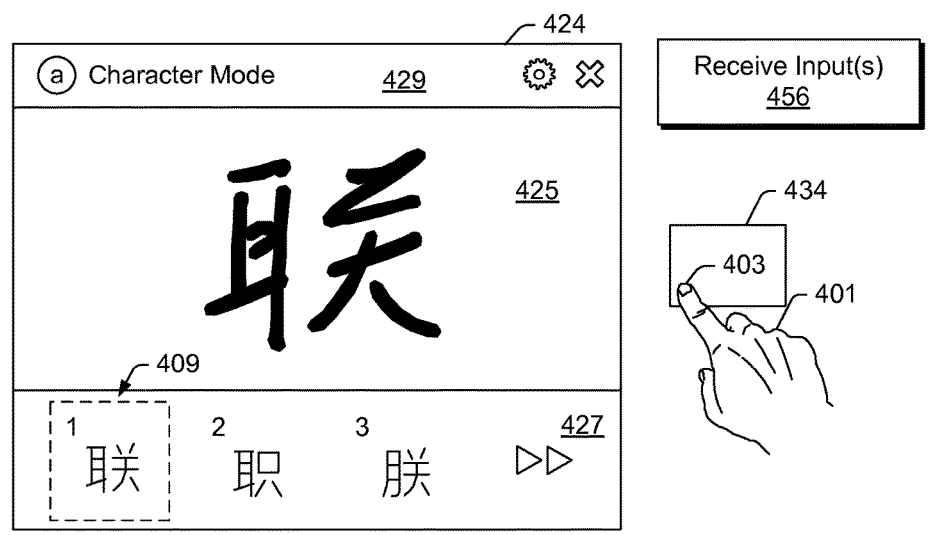

FIG. 5 shows some additional examples of the graphic 424 of FIG. 4, which may be considered collectively as part of a method. As shown in FIG. 5, a user's hand 401 touches the touchpad 434 and drags a finger across the touchpad 434 to input a stroke 403. In turn, the reception block 456 of a method causes such input to be rendered as a character stroke 407 to the graphic 424 (e.g., in the character field 425). Further, a character recognition algorithm is implemented that acts to recognize a series of characters based at least in part on the strokes received via the touchpad 434 and to present one or more series of candidate characters in the control field 427 of the graphic 424.

As shown in FIG. 5, the user's hand 401 touches the touchpad 434 at a peripheral location to input a touch 403. In turn, the reception block 456 of a method causes such input to select one of the series of candidate characters as rendered to the control field 427 of the graphic 424 (e.g., to select a control in the control field 427).

Figure 6:
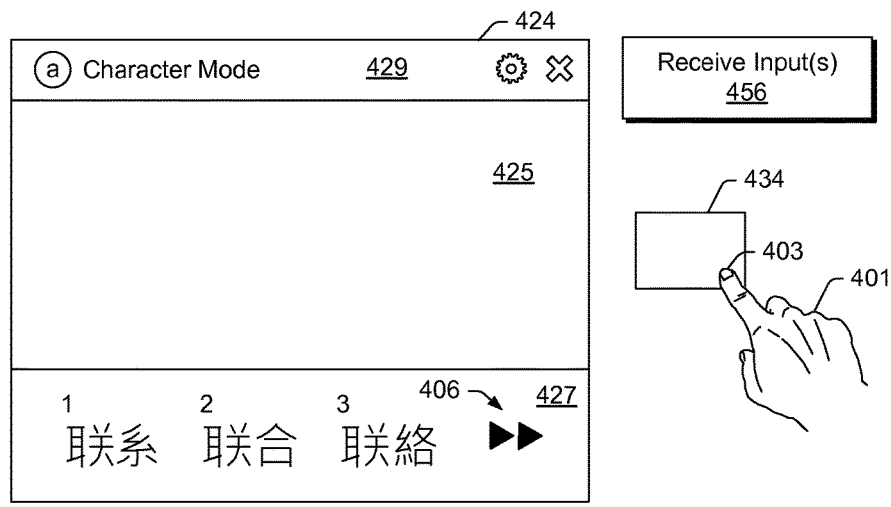
FIG. 6 is a series of diagrams of examples of a touchpad operational mode.
Figure 6:
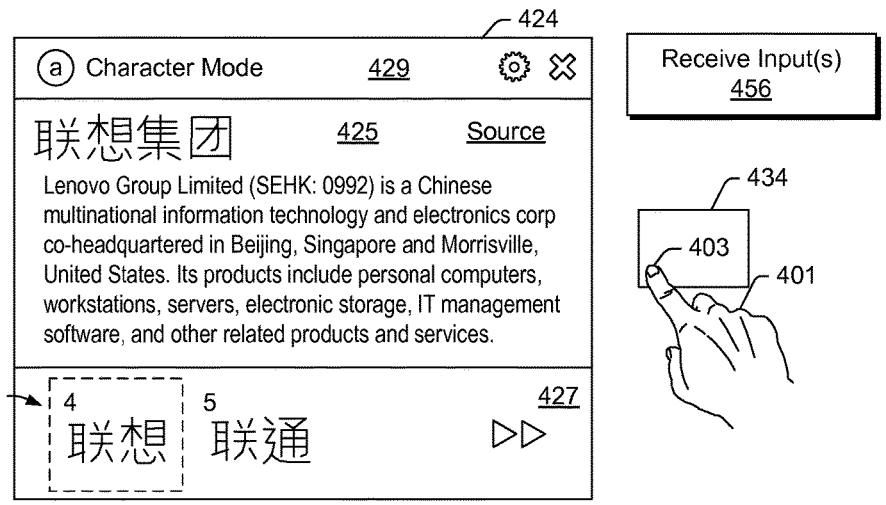

FIG. 6 shows some additional examples of the graphic 424 of FIG. 4 and FIG. 5, which may be considered collectively as part of a method. As shown in FIG. 6, a user's hand 401 touches the touchpad 434 in a peripheral portion to select a control graphic rendered in the control field 427 of the graphic 424. In turn, the reception block 456 of a method causes such input to execute the control associated with the control graphic, which is shown as a navigation control graphic to navigate the series of candidate characters as provided by a character recognition algorithm based at least in part on input strokes.

As shown in FIG. 6, the user's hand 401 touches the touchpad 434 at a peripheral location to input a touch 403. In turn, the reception block 456 of a method causes such input to select one of the series of candidate characters as rendered to the control field 427 of the graphic 424 (e.g., to select a control in the control field 427). Further, the user's hand 401 may touch the touchpad 434 at the peripheral location of the touch 403 for a length of time sufficient to cause issuance of a signal by the touchpad 434 that is associated with the selected one of the series of candidate characters. In turn, the reception block 456 of a method causes such input to instruct an application to use the selected series of candidate characters to gather more information, the information being associated with the selected series of candidate characters. For example, the application may access one or more Internet resources (e.g., search engine, WIKIPEDIA, etc.) and transmit the selected series of candidate characters to one of the Internet resources. In such an example, information received via the Internet may be rendered to the graphic 424, for example, in the character field 425.

Figure 7:
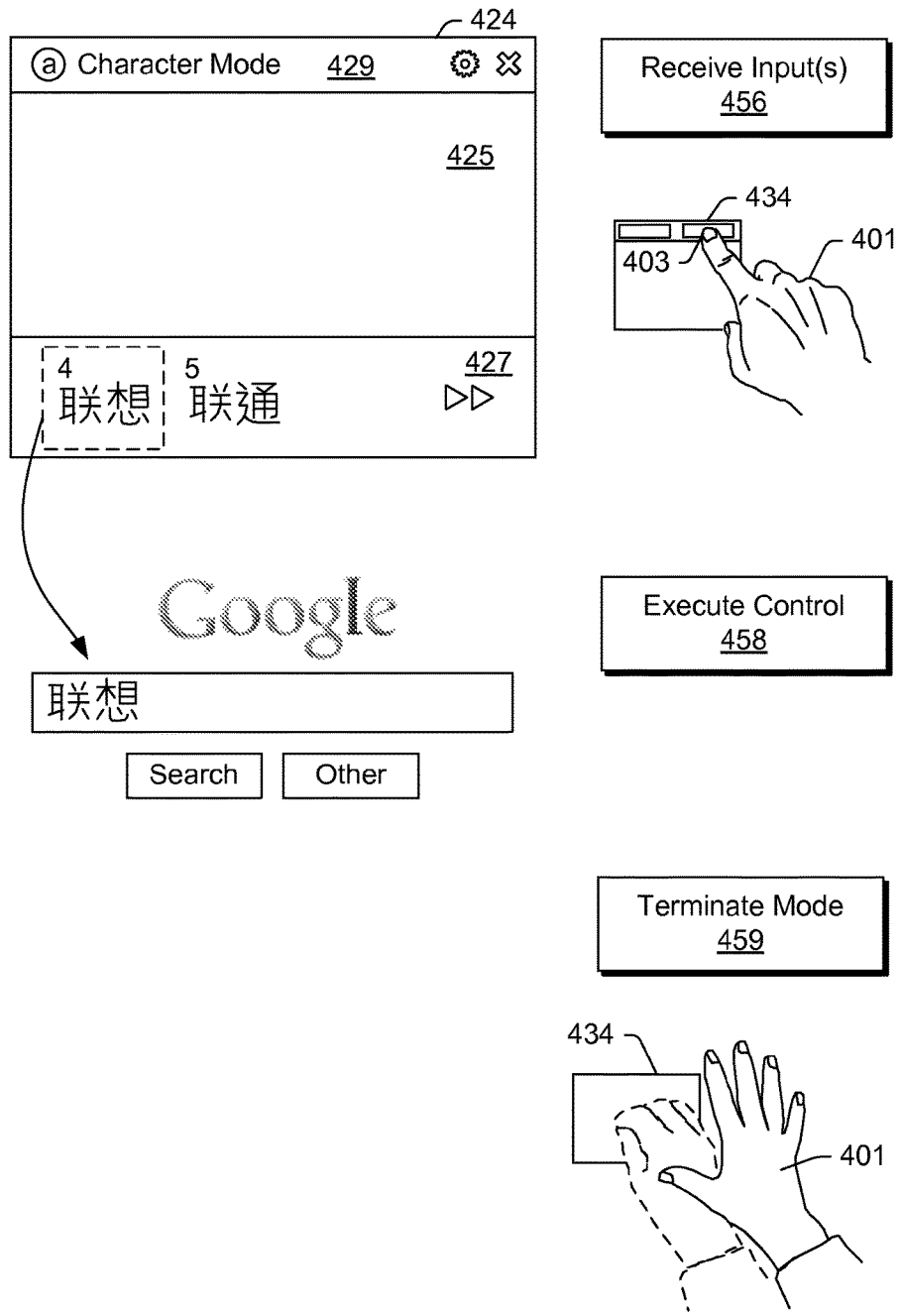
FIG. 7 is a series of diagrams of examples of a touchpad operational mode.

FIG. 7 shows an additional example of the graphic 424 of FIG. 4, FIG. 5 and FIG. 6, which may be considered collectively as part of a method. As shown in FIG. 7, a user's hand 401 touches the touchpad 434 in a peripheral portion to input a touch 403 that selects a control (e.g., a control button of the touchpad 434). In turn, the reception block 456 of a method proceeds to an execution block 458 that causes such input to execute the control, which is shown as an insertion control to insert the selected series of candidate characters into a field of a webpage (e.g., as rendered to a display via a browser application). As an example, the control may also cause the application to take one or more actions (e.g., perform a search).

FIG. 7 also shows an example of the touchpad 434 with respect to a termination block 459, which may terminate a particular touchpad operational mode (e.g., the character mode). In the example of FIG. 7, the user's hand 401 may input a gesture that generates a signal or signals, for example, recognized by a mode dispatcher associated with the touchpad 434 to terminate the character mode and, for example, to return the touchpad 434 to a "normal" operational mode (e.g., for use of the touchpad 434 as a pointing device to move a cursor graphic rendered to a display). Upon receipt of a termination command, the graphic 424 may "disappear" from a display as its functionality may not be required during a "normal" operational mode.

Figure 8:
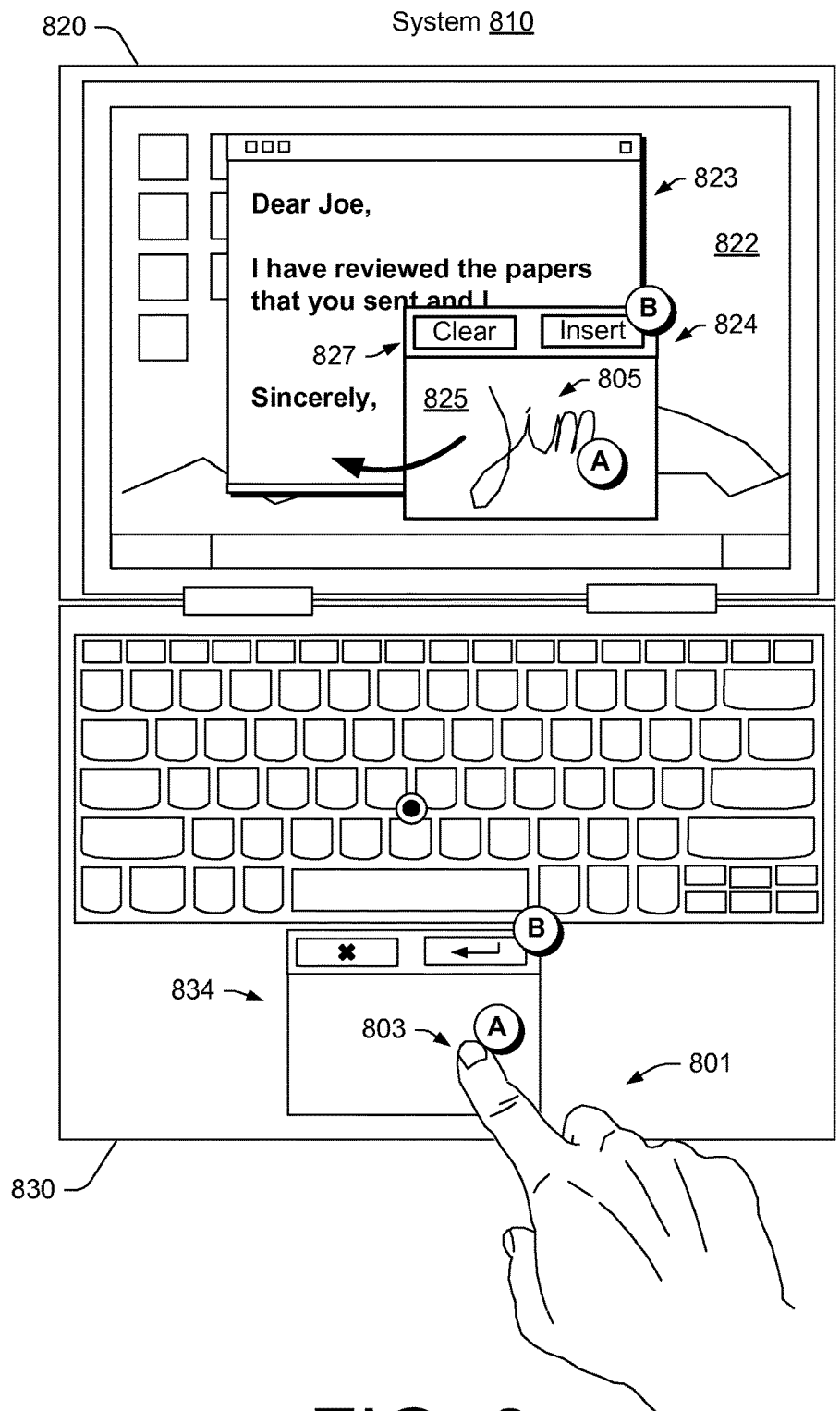
FIG. 8 is a diagram of an example of a touchpad operational mode.

FIG. 8 shows an example of a system 810 with respect to a touchpad drawing mode. As shown, the system 810 includes a display portion 820 that includes a display 822 and a keyboard portion 830 that includes a touchpad 834. As shown in the example of FIG. 8, for the drawing mode, a graphic 824 is rendered to the display 822 where the graphic 824 includes a drawing field 825 (e.g., a touchpad field) and a control field 827. For an action labeled "A", a user's hand 801 touches a central portion of the touchpad 834 to input drawing strokes 803 where the drawing mode (see, e.g., the drawing mode circuitry 394 of FIG. 3) causes the drawing strokes to be rendered visually as a signature 805 to the drawing field 825 of the graphic 824.

For an action labeled "B", the user's hand 801 can touch a peripheral portion of the touchpad 834 where the peripheral portion of the touchpad 834 is mapped to a control graphic of the control field 827 of the graphic 824. In the example of FIG. 8, the control field 827 shows a "clear" control graphic and an "insert" control graphic. These may correspond to touchpad buttons, which may be part of a touch sensing surface of the touchpad, part of a depressible button switch surface of the touchpad, etc. Such touchpad buttons may be visible or hidden by a flat touch surface of a touchpad. Referring again to the action labeled "B", where the user's hand 801 touches the right button of the touchpad 834, the insert control is selected which may instruct the system 810 to insert the drawing in the drawing field 825 of the graphic 824 into a document 823 (e.g., as associated with an application such as a browser application, a word processing application, a form application, a pdf application, an email application, etc.).

Figure 9:
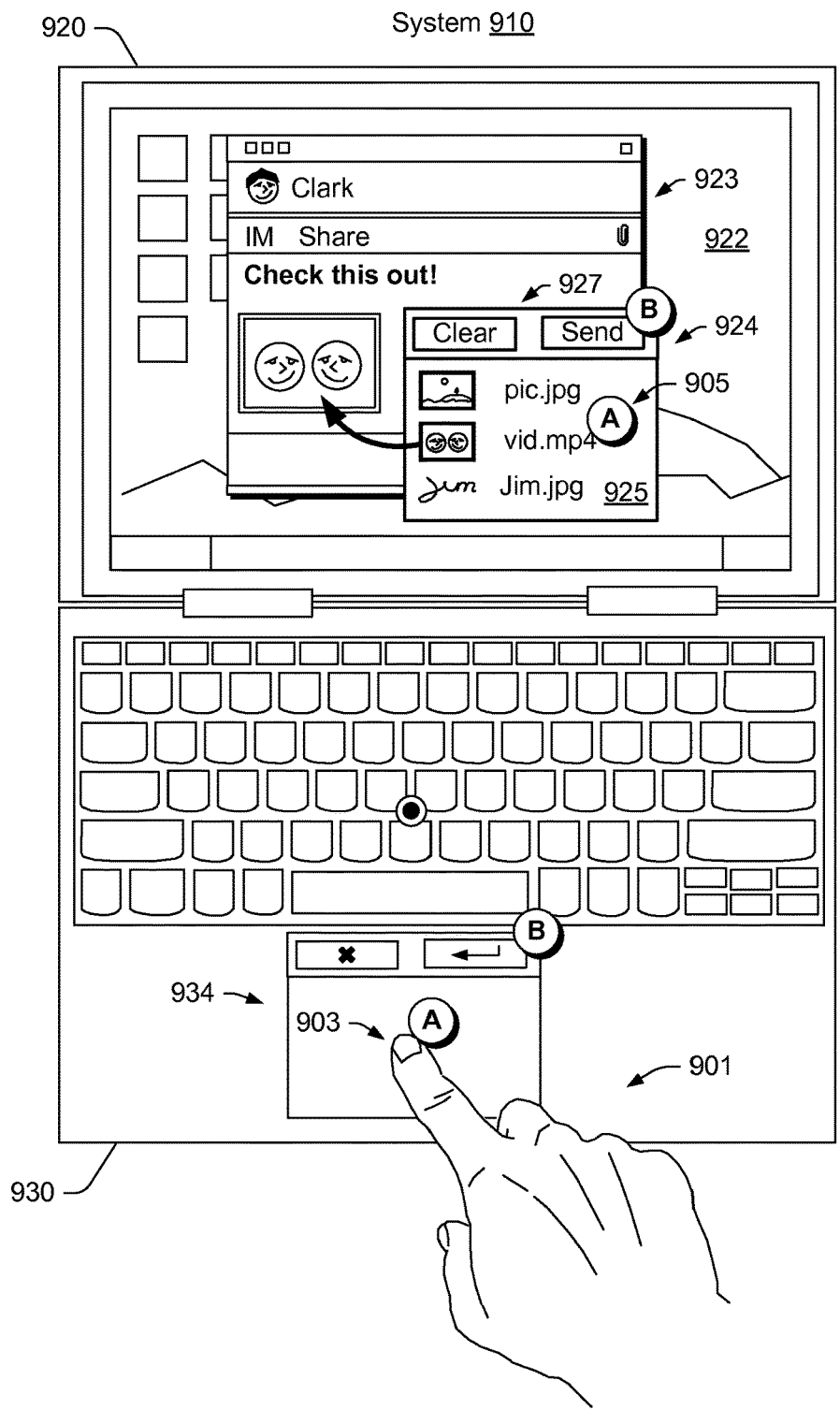
FIG. 9 is a diagram of an example of a touchpad operational mode.

FIG. 9 shows an example of a system 910 with respect to a touchpad navigation mode. As shown, the system 910 includes a display portion 920 that includes a display 922 and a keyboard portion 930 that includes a touchpad 934. As shown in the example of FIG. 9, for the navigation mode, a graphic 924 is rendered to the display 922 where the graphic 924 includes a content field 925 (e.g., a touchpad field) and a control field 927. For an action labeled "A", a user's hand 801 touches a central portion of the touchpad 934 to input a touch 903 where the navigation mode (see, e.g., the navigation mode circuitry 396 of FIG. 3) causes the touch 903 to be mapped as a selection 905 of a content file icon displayed in the content field 925 of the graphic 924.

For an action labeled "B", the user's hand 901 can touch a peripheral portion of the touchpad 934 where the peripheral portion of the touchpad 934 is mapped to a control graphic of the control field 927 of the graphic 924. In the example of FIG. 9, the control field 927 shows a "clear" control graphic and a "send" control graphic. These may correspond to touchpad buttons, which may be part of a touch sensing surface of the touchpad, part of a depressible button switch surface of the touchpad, etc. Such touchpad buttons may be visible or hidden by a flat touch surface of a touchpad. Referring again to the action labeled "B", where the user's hand 901 touches the right button of the touchpad 934, the send control is selected which may instruct the system 910 to send the selected content file represented by the content field icon in the content field 925 of the graphic 924 via a communication application 923 (e.g., an email application, an IM application, etc.).

In the example of FIG. 9, a hover or hold touch input may issue a command. For example, where a hover or hold touch input corresponds to a content file icon, a command may be issued to cause visual rendering of a portion of associated content (e.g., a visual preview of content from the content file), audio rendering of a portion of associated content (e.g., an audible preview of content from the content file), etc.

Figure 10:
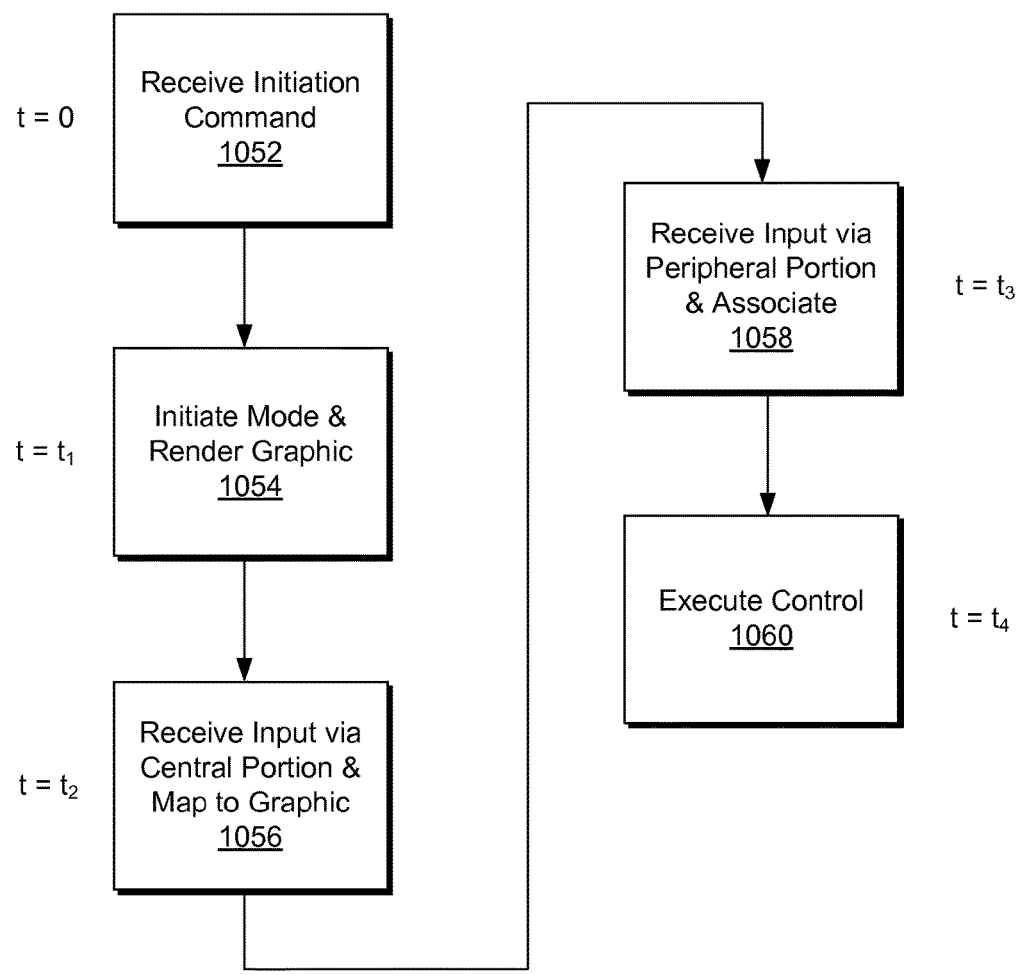
FIG. 10 is a diagram of an example of a method.

FIG. 10 shows an example of a method 1050 that includes a reception block 1052 for receiving an initiation command to initiate an operational mode of a touchpad, the touchpad being operatively coupled to a processor operatively coupled to a display, the display nonoverlapping being separate from the touchpad; an initiation and render block 1054 for, responsive to the initiation command, initiating the operational mode and rendering a graphic to the display where the graphic includes a touchpad field and a control field; a reception and map block 1056 for receiving input via a central portion of the touchpad and mapping the input received via the central portion to the touchpad field of the graphic; a reception and associate block 1058 for receiving input via a peripheral portion of the touchpad and associating the input received via the peripheral portion with a control of the control field of the graphic, the control being associated with the input via the central portion of the touchpad; and an execution block 1060 for executing the control of the control field of the graphic. As indicated in the example of FIG. 10, the various actions may occur with respect to time, for example, for times $t=0$ to $t=t_4$; noting that each block may operate over a window in time (e.g., a span of time).

As an example, a method can include a character operational mode, for example, where receiving input via a central portion of a touchpad includes receiving a character stroke and where mapping includes rendering the character stroke to a touchpad field of a graphic. As an example, a method can include performing character recognition responsive to receiving input via a central portion of a touchpad. In such an example, responsive to performing character recognition, a method can include rendering one or more candidate characters to a control field of a graphic. Such a method can include associating input received via a peripheral portion of the touchpad with one of the one or more candidate characters.

As an example, a method can include receiving a termination command to terminate, for example, a character operational mode of a touchpad, a drawing operational mode of a touchpad, a content navigation operational mode of a touchpad, etc. As an example, such a command may be associated with a gesture input via the touchpad.

As an example, a method can include a drawing operational mode. For example, such a method may include receiving input via a central portion of a touchpad where the input includes a drawing stroke and where the method includes mapping the input by rendering the drawing stroke to a touchpad field of the graphic. As an example, such a method can include associating input received via a peripheral portion by associating the input with an insertion control to insert at least the drawing stroke into a document. As an example, a document may be a webpage.

As an example, a method can include a content navigation operational mode. In such an example, a method can include rendering content file icons to a touchpad field of a graphic. Such a method may further include receiving input via a central portion of a touchpad by receiving a touch and mapping the touch to one of the content file icons. Such a method may include associating input received via a peripheral portion of the touchpad with a transmission control of a control field of the graphic such that the method initiates transmission of the content file associated with the content file icon.

As an example, a method can include receiving input via a touchpad and, responsive to the input, visually rendering (e.g., to a display) or audibly rendering (e.g., to a speaker or speakers) a preview of content, for example, as associated with at least one file icon that has been rendered to the display. In such an example, a user may touch the touchpad (e.g., a hover for a period of time) where the touch is associated with a content file icon rendered to a display and, in turn, a command may be issued that causes rendering of a preview of content associated with that content file icon to the display, to speakers, etc. In such an example, a preview may be, for example, an image snapshot, a music preview (e.g. audio optionally along with visual), a long text preview, etc.

As an example, a method can include selecting an operational mode from two or more operational modes, for example, where the two or more operational modes include at least one of a character operational mode, a drawing operational mode and a content navigation operational mode.

As an example, one or more computer-readable storage media can include process-executable instructions to instruct a processor to: receive an initiation command to initiate an operational mode of a touchpad, the touchpad being operatively coupled to the processor operatively coupled to a display, the display nonoverlapping the touchpad; responsive to the initiation command, initiate the operational mode and render a graphic to the display where the graphic includes a touchpad field and a control field; receive input via a central portion of the touchpad and map the input received via the central portion to the touchpad field of the graphic; receive input via a peripheral portion of the touchpad and associate the input received via the peripheral portion with a control of the control field of the graphic, the control being associated with the input via the central portion of the touchpad; and execute the control of the control field of the graphic.

As an example, a system can include a processor; a memory device having memory accessible by the processor; a touchpad operatively coupled to the processor; a display nonoverlapping the touchpad and operatively coupled to the processor; instructions stored in the memory and executable by the processor to instruct the system to: receive an initiation command to initiate an operational mode of the touchpad; responsive to the initiation command, initiate the operational mode and render a graphic to the display where the graphic includes a touchpad field and a control field; receive input via a central portion of the touchpad and map the input received via the central portion to the touchpad field of the graphic; receive input via a peripheral portion of the touchpad and associate the input received via the peripheral portion with a control of the control field of the graphic, the control being associated with the input via the central portion of the touchpad; and execute the control of the control field of the graphic.

Figure 11:
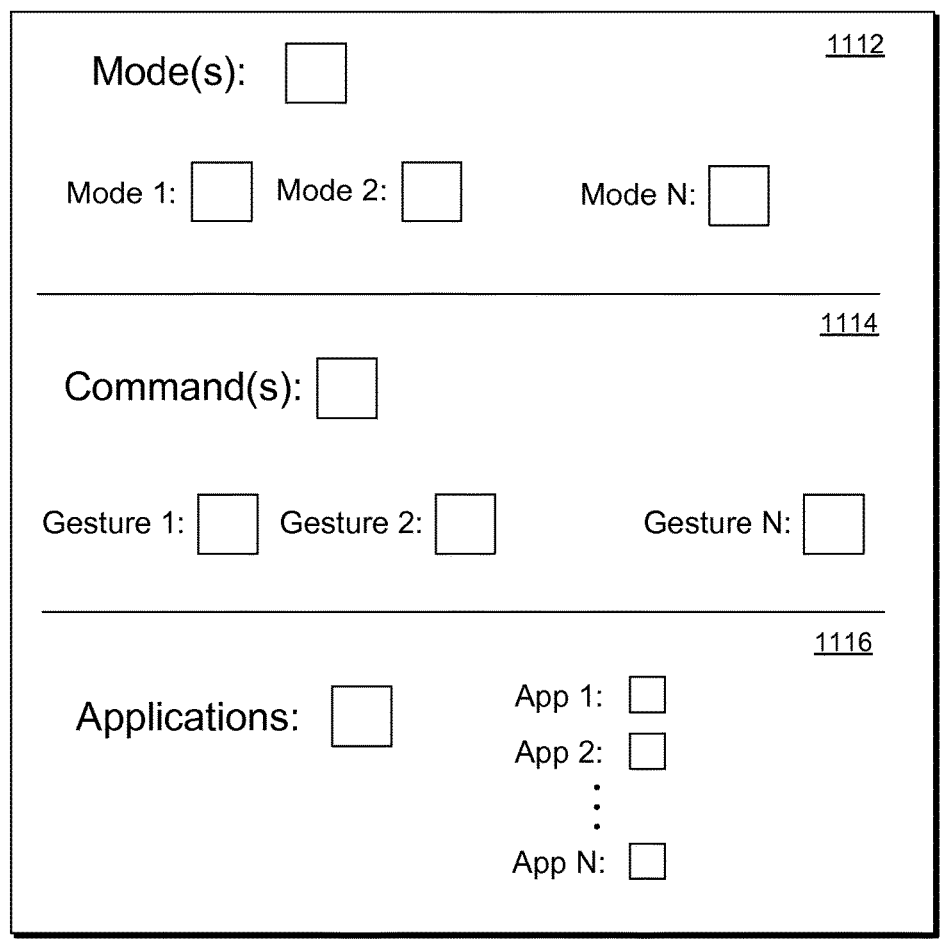
FIG. 11 is a diagram of an example of a graphical user interface.

FIG. 11 shows an example of a graphical user interface (GUI) 1110. Such a GUI may be implemented, for example, to configure one or more touchpad operational modes. For example, the GUI 1110 includes a mode(s) field 1112 for selection of modes that may be activated by responsive to input; a command(s) field 1114 for selecting one or more commands such as gestures for purposes of initiating, terminating, switching, etc. touchpad operational mode(s); and an applications field 1116, for example, to associate one or more modes with one or more applications. As an example, a GUI may provide for adjusting one or more dimensions of a peripheral region or portion, for example, to accommodate a user's finger size, style of touch, etc.

As an example, a system can include an interface to pass data from a touchpad to an operating system (OS), applications, etc. For example, such an interface may be an HID-I2C or an HID-USB. As an example, interface support circuitry may utilize a SMBus (e.g., running via a physical I2C interface). As an example, interface support circuitry may provide for multi-touch "full-time finger tracking" (e.g., for gestures). As an example, support circuitry may be provided as to image sensing touchpads, for example, to provide full-time tracking of ten or more fingers simultaneously (e.g., which may be not be feasible via a legacy PS/2 interface).

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 12:
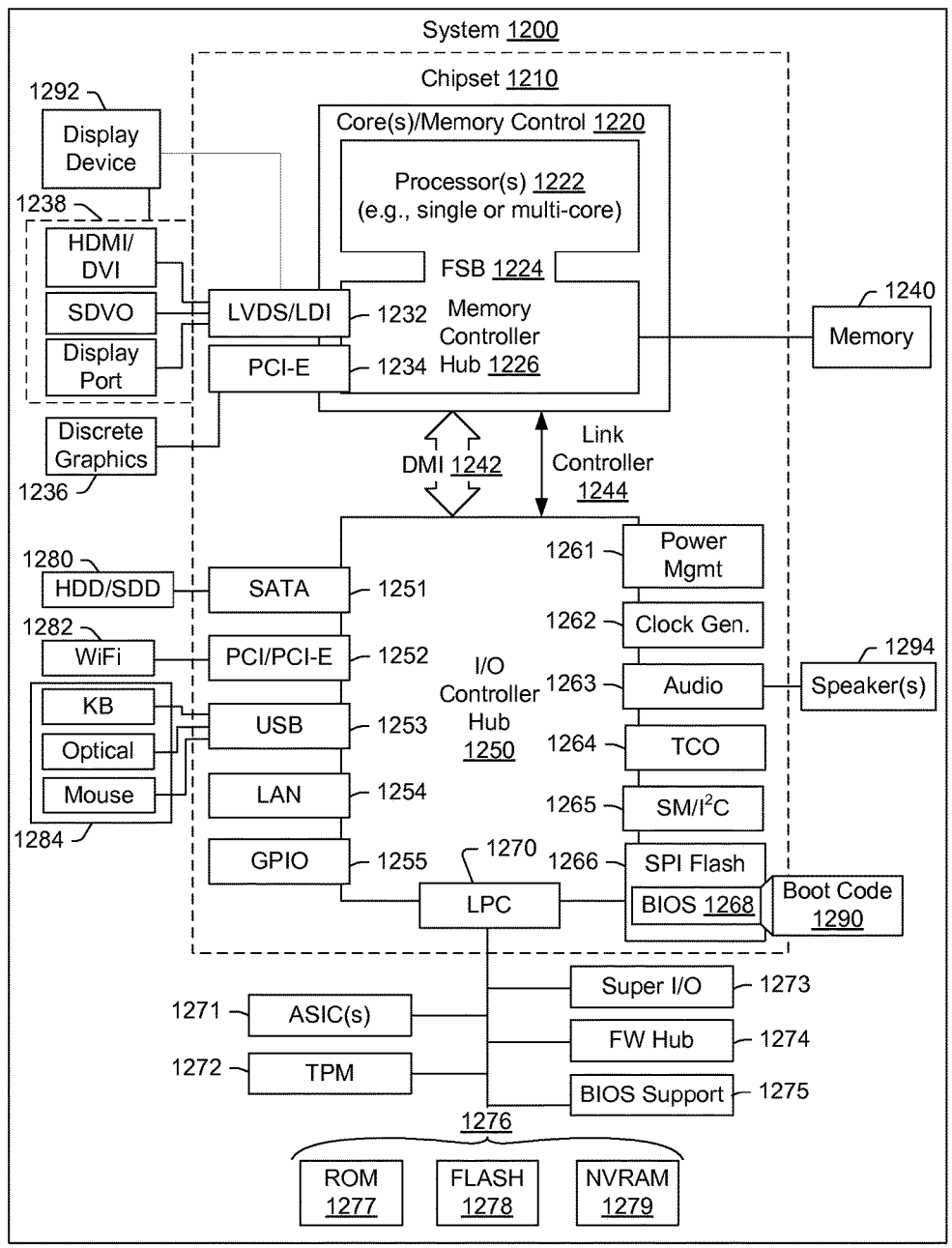
FIG. 12 is a diagram of an example of a system.

While various examples of circuits or circuitry have been discussed, FIG. 12 depicts a block diagram of an illustrative computer system 1200. The system 1200 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1200. As described herein, a device such as the device 501 may include at least some of the features of the system 1200.

As shown in FIG. 12, the system 1200 includes a so-called chipset 1210. A chipset refers to a group of integrated circuits, or chips, that are designed to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (x16) PCI-E port for an external PCI-E-based graphics card. A system may include AGP or PCI-E for support of graphics.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, mice and various other devices (e.g., cameras, phones, storage, media players, etc.). As noted, a touchpad may be implemented using one or more types of interfaces (e.g., the USB interface 1253 or another interface such as I²C, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268. Again, as described herein, a satellite, a base, a server or other machine may include fewer or more features than shown in the system 1200 of FIG. 12.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
a processor;
a memory device having memory accessible by the processor;
a touchpad operatively coupled to the processor;
a display nonoverlapping the touchpad and operatively coupled to the processor; and
instructions stored in the memory and executable by the processor wherein the instructions comprise instructions to instruct the system to:
associate different individual gestures with different individual touchpad operational modes that comprise associated different individual control fields,
select one of the touchpad operational modes responsive to receipt via the touchpad of an associated one of the gestures, and
control rendering of a graphic to the display wherein the graphic comprises a touchpad field and the control field associated with the selected one of the touchpad operational modes,
wherein the touchpad operational modes comprise a navigation mode wherein file icons are rendered to the touchpad field, wherein file controls are rendered to the control field, wherein one or more of the file controls issues a command responsive to input received via the touchpad, and wherein the command causes the system to operate on content of a file represented by one of the file icons.

2. The system of claim 1 wherein the touchpad operational modes comprise a normal mode and a drawing mode.

3. The system of claim 1 wherein the selected touchpad operational mode comprises a character recognition mode that renders character strokes to the touchpad field responsive to receipt of input via the touchpad and that renders candidate characters, based at least in part on the character strokes, to the control field.

4. The system of claim 3 wherein the control field comprises an insertion control that inserts selected candidate characters into a field of a webpage as rendered to the display via a browser application.

5. The system of claim 1 wherein the gestures comprise at least one multi-touch gesture.

6. The system of claim 1 wherein the display comprises a touchscreen display.

7. The system of claim 6 wherein the graphic comprises a control that closes the graphic responsive to receipt of an instruction via the touchscreen display.

8. The system of claim 1 comprising a termination gesture that terminates the selected touchpad operational mode.

9. The system of claim 1 wherein the system comprises a keyboard portion that comprises the touchpad, wherein the system comprises a display portion that comprises the display and wherein the system comprises a hinge that operatively couples the keyboard portion and the display portion.

10. The system of claim 1 wherein the instructions comprise instructions to render a graphical user interface to the display wherein the graphical user interface comprises a command field that associates the gestures and the touchpad operational modes.

11. The system of claim 1 wherein the gestures comprise gestures for initiating the touchpad operational modes and for switching from one of the touchpad operational modes to another one of the touchpad operational modes.

12. The system of claim 1 wherein the content of the file comprises renderable content.

13. A method comprising:
associating different individual gestures with different individual touchpad operational modes that comprise associated different individual control fields;
selecting one of the touchpad operational modes responsive to receipt via a touchpad of an associated one of the gestures; and
controlling rendering of a graphic to the display wherein the graphic comprises a touchpad field and the control field associated with the selected one of the touchpad operational modes,
wherein the touchpad operational modes comprise a navigation mode wherein file icons are rendered to the touchpad field, wherein file controls are rendered to the control field, wherein one or more of the file controls issues a command responsive to input received via the touchpad, and wherein the command causes the method to operate on content of a file represented by one of the file icons.

14. The method of claim 13 comprising receiving a gesture via the touchpad and transitioning from the selected one of the touchpad operational modes to another one of the touchpad operational modes.

15. The method of claim 14 wherein the transitioning comprises rendering a different graphic to the display wherein the different graphic comprises a touchpad field and the control field associated with the other one of the touchpad operational modes.

16. The method of claim 13 comprising rendering a graphical user interface to the display that comprises controls for associating the different individual gestures with the different individual touchpad operational modes.

17. The method of claim 13 wherein the content of the file comprises renderable content.

18. One or more non-transitory computer-readable storage media comprising process-executable instructions wherein the instructions comprise instructions to instruct a processor to:
associate different individual gestures with different individual touchpad operational modes that comprise associated different individual control fields;
select one of the touchpad operational modes responsive to receipt via a touchpad of an associated one of the gestures; and
control rendering of a graphic to a display wherein the graphic comprises a touchpad field and the control field associated with the selected one of the touchpad operational modes,
wherein the touchpad operational modes comprise a navigation mode wherein file icons are rendered to the touchpad field and wherein file controls are rendered to the control field, wherein one or more of the file controls issues a command responsive to input received via the touchpad, and wherein the command causes the processor to operate on content of a file represented by one of the file icons.

19. The one or more non-transitory computer-readable storage media of claim 18 wherein the content of the file comprises renderable content.

* * * * *